(12) United States Patent
Bert et al.

(10) Patent No.: US 9,256,384 B2
(45) Date of Patent: Feb. 9, 2016

(54) METHOD AND SYSTEM FOR REDUCING WRITE LATENCY IN A DATA STORAGE SYSTEM BY USING A COMMAND-PUSH MODEL

(71) Applicant: LSI Corporation, San Jose, CA (US)

(72) Inventors: Luca Bert, Cumming, GA (US); Anant Baderdinni, Lawrenceville, GA (US); Horia Simionescu, Foster City, CA (US); Mark Ish, Sandy Springs, GA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 261 days.

(21) Appl. No.: 13/758,853

(22) Filed: Feb. 4, 2013

(65) Prior Publication Data

US 2014/0223071 A1 Aug. 7, 2014

(51) Int. Cl.
*G06F 3/06* (2006.01)
*G06F 13/28* (2006.01)
*G06F 13/38* (2006.01)

(52) U.S. Cl.
CPC .............. *G06F 3/0679* (2013.01); *G06F 13/28* (2013.01); *G06F 13/38* (2013.01)

(58) Field of Classification Search
CPC ........ G06F 3/0679; G06F 13/28; G06F 13/38
USPC ....................... 711/103, 125, 154; 365/185.33
See application file for complete search history.

(56) References Cited

U.S. PATENT DOCUMENTS

| | | | |
|---|---|---|---|
| 6,622,227 B2 * | 9/2003 | Zumkehr et al. | 711/167 |
| 6,901,494 B2 * | 5/2005 | Zumkehr et al. | 711/167 |
| 7,552,144 B2 * | 6/2009 | Dai et al. | 1/1 |
| 7,890,696 B2 * | 2/2011 | Lawson | 711/112 |
| 7,921,178 B2 | 4/2011 | Haviv | |
| 8,463,979 B2 * | 6/2013 | Schuette | 711/5 |
| 8,495,258 B2 * | 7/2013 | Bakke et al. | 710/22 |
| 8,732,396 B2 * | 5/2014 | Bert | 711/114 |
| 8,856,479 B2 * | 10/2014 | Gerhard et al. | 711/168 |
| 2005/0038946 A1 * | 2/2005 | Borden | 710/310 |
| 2010/0312960 A1 * | 12/2010 | Bert | 711/113 |
| 2011/0060869 A1 * | 3/2011 | Schuette | 711/103 |
| 2012/0278544 A1 * | 11/2012 | Eleftheriou et al. | 711/103 |
| 2013/0205299 A1 * | 8/2013 | Shin et al. | 718/103 |
| 2014/0082234 A1 * | 3/2014 | Gopalakrishnan et al. | 710/52 |

FOREIGN PATENT DOCUMENTS

WO 2008/070172 A2 6/2008

* cited by examiner

*Primary Examiner* — Stephen Elmore
(74) *Attorney, Agent, or Firm* — Daniel J. Santos; Smith Risley Tempel Santos LLC

(57) ABSTRACT

A data storage system is provided that implements a command-push model that reduces latencies. The host system has access to a nonvolatile memory (NVM) device of the memory controller to allow the host system to push commands into a command queue located in the NVM device. The host system completes each IO without the need for intervention from the memory controller, thereby obviating the need for synchronization, or handshaking, between the host system and the memory controller. For write commands, the memory controller does not need to issue a completion interrupt to the host system upon completion of the command because the host system considers the write command completed at the time that the write command is pushed into the queue of the memory controller. The combination of all of these features results in a large reduction in overall latency.

19 Claims, 5 Drawing Sheets

METHOD AND SYSTEM FOR REDUCING WRITE LATENCY IN A DATA STORAGE SYSTEM BY USING A COMMAND-PUSH MODEL

TECHNICAL FIELD OF THE INVENTION

The invention relates generally to data storage systems and, more particularly, to a method and system for using a command-push model in a data storage system to reduce write latency.

BACKGROUND OF THE INVENTION

A storage array or disk array is a data storage device that includes multiple hard disk drives (HDDs) or similar persistent storage units. A storage array can allow large amounts of data to be stored in an efficient manner. A server or workstation may be directly attached to the storage array such that the storage array is local to the server or workstation. In cases in which the server or workstation is directly attached to the storage array, the storage array is typically referred to as a direct-attached storage (DAS) system. Alternatively, a server or workstation may be remotely attached to the storage array via a storage array network (SAN). In SAN systems, although the storage array is not local to the server or workstation, the disk drives of the array appear to the operating system (OS) of the server or workstation to be locally attached.

FIG. 1 illustrates a block diagram of a typical data storage system 2 that implements a command-pull model. The system 2 includes a host system 3, a memory controller 4, and a peripheral interconnect (PCI) or PCI Express (PCIe) bus 5. The controller 4 includes a central processing unit (CPU) 6, a memory device 7, and an I/O interface device 8. The I/O interface device 8 is configured to perform data transfer in compliance with known data transfer protocol standards, such as the Serial Attached SCSI (SAS) standard, the Serial Advanced Technology Attachment (SATA) standard, or the Nonvolatile Memory Host Controller Interface Express (NVMe) standard. The I/O interface device 8 controls the transfer of data to and from multiple physical disks (PDs) 9. The memory controller 4 communicates via the PCI bus 5 with a system CPU 11 and a system memory device 12. The system memory device 12 stores software programs for execution by the system CPU 11 and data. A portion of the system memory device 12 is used as a command queue 13.

During a typical write action, the system CPU 11 runs a memory driver software stack 14 that stores commands and data in the command queue 13. When the memory driver 14 stores a command in the command queue 13, it notifies the memory controller 4 that a command is ready to be executed. When the controller CPU 6 is ready to execute a command, it pulls the command, or multiple commands, and the associated data from the system queue 13 via the bus 5 and issues a completion interrupt to the host system 3. When the commands are executed by the memory controller 4, the controller CPU 6 causes the data associated with the commands to be temporarily stored in the controller memory device 7 and then subsequently written to one or more of the PDs 9 via the I/O interface device 8.

Historically, the performance of an HDD-based system of the type shown in FIG. 1 has been measured in terms of input/output (IO) per second (IOPS), and in some cases, megabytes per second (MB/s). Latency of such a storage system is typically given as: Latency_Overall=Latency_SW_Stack+Latency_Controller+Latency_HDD=1/IOPS, where Latency_Overall is the overall latency of the system, Latency_SW_Stack is the latency associated with the memory driver 14, Latency_Controller is the latency associated with the memory controller 4, and Latency_HDD is the latency associated with the PDs 9. Latency_SW_Stack is typically on the order of microseconds ($10^{-6}$ seconds). Likewise, Latency_Controller is typically on the order of tens of microseconds. However, Latency_HDD is typically on the order of milliseconds ($10^{-3}$ seconds) or tens of milliseconds. Approximately 99% of overall latency is due to extremely slow mechanical parts of the HDDs. Therefore, for practical purposes, Latency_SW_Stack and Latency_Controller can be ignored when determining system performance. In other words, system performance can be estimated as being equal to Latency_HDD.

Recently, there has been a transition from using magnetic HDDs as the PDs 9 to using solid state drives (SSDs), or a combination of SSDs and HDDs, as the PDs 9. In the industry, the use of SSD-based solutions is viewed as an evolution of HDD-based solutions. However, SSD-based solutions are approximately one hundred times faster and consume much less power than HDD-based solutions. This view of SSD-based solutions has led the industry to continue using the pre-existent, above-described pull methodology in SSD-based solutions to pull commands from the command queue into the memory controller. Also, because SSD-based solutions have been viewed in the industry as merely an evolution of HDD-based solutions, IOPS have been used as the performance metric for measuring system performance in storage systems that implement SSD-based solutions.

However, the differences between SSD-based solutions and HDD-based solutions are much greater than it appears, and traditional metrics should not be used to measure the performance of systems that implement SSD-based solutions. In a system that implements an SSD-based solution, the overall latency of the storage system is given as: Latency_Overall=Latency_SW_Stack+Latency_Controller+Latency_SSD=1/IOPS, where Latency_SW_Stack is the latency associated with the memory driver 14, Latency_Controller is the latency associated with the memory controller 4, and Latency_SSD is the latency associated with the SSDs that are used as the PDs 9. Unlike the latency of the HDDs, the latency of the SSDs is on the order of tens to hundreds of microseconds, e.g., generally in the range of 100 to 300 microseconds, and the latencies associated with the memory driver 14 and the memory controller 4 add much more than that to the overall latency. Therefore, in calculating the overall latency of the storage system that implements an SSD-based solution, Latency_SW_Stack and Latency_Controller should no longer be ignored.

The command-pull approach requires quite a bit of interaction between the memory driver 14 and the memory controller 4. This is a convenient approach in HDD-based systems in that it allows the fast operating system (OS) side of the host system 3 to be almost completely independent of the slower HDD-based controller side so that the OS side can pile up as many commands as possible in the queue 13 to provide greater queue depth (QD), which is very desirable and common in HDD-based solutions. The memory controller 4 can then pull the commands from the queue 13 at its own pace. While this method is very convenient in HDD-based solutions, it adds a large amount of extra latency due to the synchronization that is required between the memory controller 4 and the host system 3, and due to the fact that the memory controller 4 may pick up commands at times much later than when they were issued. In addition, if there is lot of work to be done by the memory controller 4, as is often the case, all of the command processing must compete with the rest of workload of the memory controller 4, which adds more latency to the overall latency.

The above-described command-pull model works very well for HDD-based solutions where adding 50 to 500 microseconds to a command that typically may take about 10,000 microseconds to complete is negligible given the other advantages that the method provides. However, the command-pull model does not produce acceptable results when used in a storage system that implements an SSD-based solution where the access time may be as low as 100 microseconds, or, in cases in which a dynamic random access memory (DRAM) write back (WB) buffer is used in the memory controller 4, as low as 1 to 5 microseconds.

Nevertheless, as indicated above, the overall latency of storage systems that implement SSD-based solutions is still being estimated as being equal to Latency_SSD, while leaving Latency_SW_Stack and Latency_Controller out of the estimation. For this reason, attempts at reducing the overall latency of storage systems that implement SSD-based solutions have focused primarily on reducing Latency_SSD rather than on reducing Latency_SW_Stack or Latency_Controller.

A need exists for a storage system that implements an SSD-based solution and that significantly reduces overall latency by significantly reducing one or both of Latency_SW_Stack and Latency_Controller.

SUMMARY OF THE INVENTION

The invention provides a data storage system, a memory controller, a method and a computer-readable medium, all of which implement a command-push model that reduces latency. The data storage system comprises a host system, a memory controller, at least one SSD, and a bus that interconnects the host system and the memory controller. The host system comprises a system processor and a system memory device. The memory controller comprises a controller processor, a nonvolatile memory (NVM) device and an input/output (I/O) interface device. A portion of the NVM device is used as a command queue. The SSD is connected to the I/O interface device and is configured as an array of PDs. The host system accesses the NVM device via the bus and pushes commands into the command queue of the NVM device via the bus.

The method comprises:

in a memory controller comprising a controller processor, a NVM device and an I/O interface device connected to at least one SSD configured as an array of PDs, configuring a portion of the NVM device as a command queue; and with a host system interconnected with the memory controller via a bus, pushing a command into the memory controller via the bus; and in the memory controller, storing the command in the command queue of the NVM device.

The computer-readable medium has a computer program stored thereon for execution by a processor of a host system for pushing commands into a command queue of a NVM device of a memory controller that is connected to the host system via a bus. The computer program comprises first and second code portions. The first code portion receives a command to read or write one or more addresses of a SSD configured as an array of PDs. The second code portion pushes the command into the memory controller. In accordance with one illustrative embodiment, the second code portion pushes the command into the command queue of the NVM device of the memory controller. In accordance with another illustrative embodiment, the second code portion pushes the command into a direct memory access (DMA) engine of the memory controller that stores the command in the command queue of the NVM device of the memory controller.

These and other features and advantages of the invention will become apparent from the following description, drawings and claims.

DETAILED DESCRIPTION OF ILLUSTRATIVE EMBODIMENTS

Figure 1:
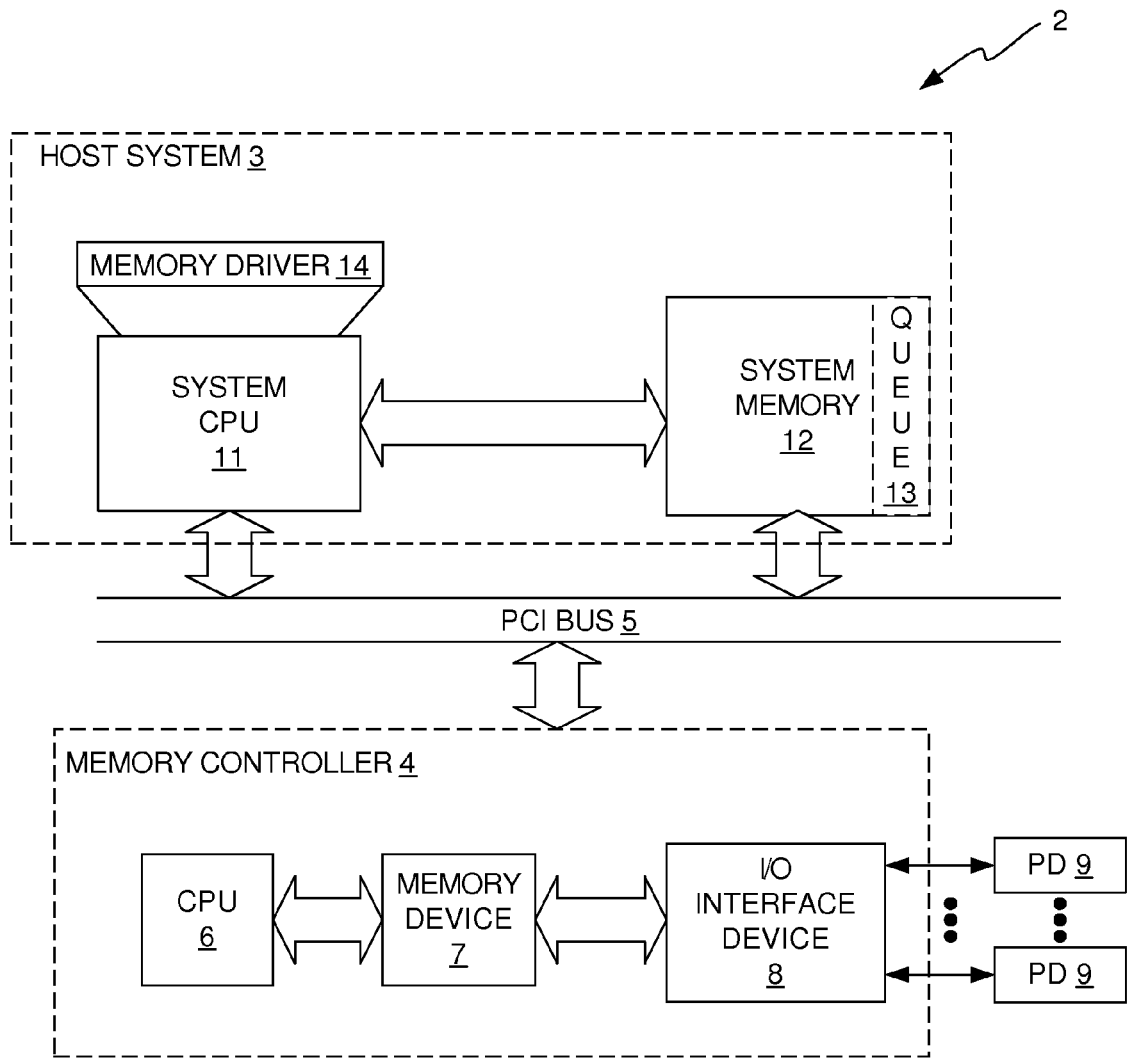
FIG. 1 illustrates a block diagram of a known data storage system that implements a command-pull model.

In accordance with the invention, a data storage system is provided that implements a command-push model that reduces the latencies associated with the memory driver and the memory controller. The command-push model eliminates the need for synchronization between the host system and the memory controller for write command IOs, thereby eliminating the latency associated with synchronization. As command IOs are issued in the host system, the host system accesses a memory device of the memory controller and pushes the command IOs and the associated data into a command queue of the memory device. Therefore, the host system completes each write command IO without any intervention from the memory controller, thereby obviating the need for synchronization, or handshaking, between the host system and the memory controller.

The memory device of the memory controller is protected against power failures and typical memory errors, and as such, may be considered a permanent storage element. Therefore, the host system may consider a write command IO as safely completed as of the time that it pushes the write command and any associated data into the command queue of the memory device of the memory controller. In other words, from the perspective of the host system, when it pushes the write command into the command queue of the memory device of the memory controller, it is as if it had completed a write to the PDs 9. Therefore, the host system completes each write command IO without any intervention from the memory controller, thereby obviating the need for synchronization, or handshaking, between the host system and the memory controller.

Furthermore, in contrast to the command-pull model described above with reference to FIG. 1, the memory controller of the invention does not need to issue a completion interrupt to the host system once the memory controller has completed processing of the write command because the host system considers the write command completed at the time that it pushes the write command into the command queue of the memory controller. This feature allows the host system and the memory controller to operate independently of one another with respect to write commands. The combination of all of these features results in a large reduction in both Latency_SW_Stack and Latency_Controller, which leads to a large reduction in overall latency.

Thus, rather than using the command-pull model described above with reference to FIG. 1 in which commands are prepared in the command queue 13 of the system memory 12 and later pulled in and processed by the memory controller 4, the host system pushes commands and any associated data into the command queue located in the memory device of the memory controller. The manner in which the host system pushes the commands and any associated data into the command queue of the memory device of the memory controller can be done in a number of ways. In accordance with a first illustrative embodiment, the memory driver of the host system programmatically pushes commands and associated data into the command queue of the memory device of the memory controller. In accordance with a second illustrative embodiment described herein, a direct memory access (DMA) engine of the memory controller pushes commands and any associated data into the command queue of the memory device of the memory controller. Both of these embodiments obviate the need for synchronization, or handshaking, between the host system and the memory controller.

Figure 2:
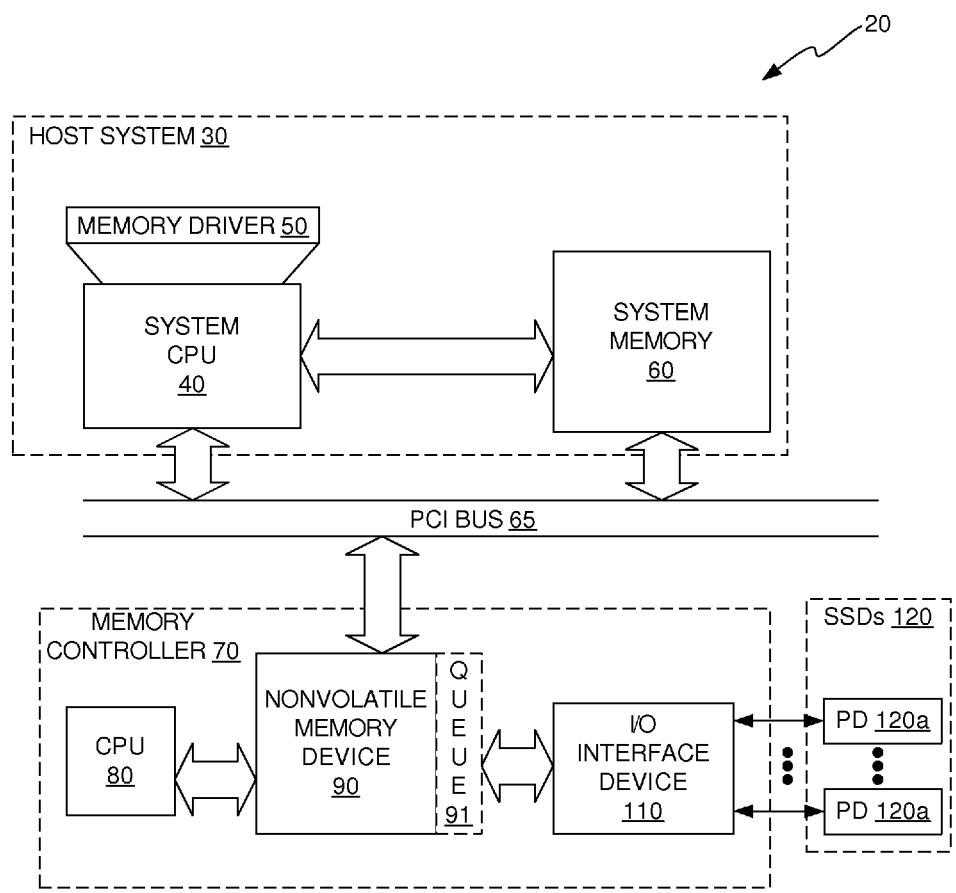
FIG. 2 illustrates a block diagram of a data storage system in accordance with an illustrative embodiment that implements a command-push model.

FIG. 2 illustrates a block diagram of a data storage system 20 in accordance with the first illustrative embodiment that implements a command-push model. The system 20 includes a host system 30, a memory controller 70, a peripheral interconnect (PCI) or PCI Express (PCIe) bus 65, and at least one SSD 120 comprising PDs 120a. The host system 30 includes a system CPU 40 and a system memory device 60. The memory controller 70 includes a CPU 80, a nonvolatile memory (NVM) device 90, and an I/O interface device 110. The NVM device 90 is typically a DRAM device. A portion of the NVM device 90 is used as a command queue 91. The I/O interface device 110 is configured to perform data transfer in compliance with known data transfer protocol standards, such as the SAS, SATA and/or NVMe standards. The I/O interface device 110 controls the transfer of data to and from multiple PDs 120a of the SSD(s) 120. The memory controller 70 communicates with the system CPU 40 via the PCI bus 65 and the memory driver 50. The system memory device 60 stores software programs for execution by the system CPU 40 and data.

In accordance with this illustrative embodiment, the memory driver 50 communicates directly with the NVM device 90 via bus 65. During a typical write action, the system CPU 40 runs a software stack that includes the memory driver 50, which pushes commands and data into the command queue 91 of the NVM device 90 and notifies the controller CPU 80 that the command and data are in the queue 91. No synchronization or handshaking between the host system 30 and the memory controller 70 is needed to perform the push action. Once the memory driver 50 has pushed a write command and the associated data into the command queue 91, the OS of the host system 30 considers the write command completed. Therefore, it is not necessary for the memory controller 70 to issue a completion interrupt to the host system 30 to inform the host CPU 40 that the write command has been completed.

When the controller CPU 80 is ready to execute the command, it retrieves the command and data from the NVM device 90 and executes the command. In the case of a write command, the controller CPU 80 causes the associated data to be written to the SSD PDs 120a via the I/O interface device 110. In the case of a read command, the controller CPU 80 checks cache (not shown for clarity) of the NVM 90 to determine whether the data to be read is in cache, and if it is, reads the data from cache and transfers it to the host system 30. If the data to be read is not in cache, the CPU 80 causes the data to be read from the SSD PDs 120a and transferred to the host system 30.

One of the key differences between the command-push model of FIG. 2 and the command-pull model of FIG. 1 is that command ownership is transferred from the host system 30 to the queue 91 of the NVM device 90 before the controller CPU 80 is even aware of the command. In the command-pull model of FIG. 1, command ownership associated with a write command is not transferred until the host system 3 receives the completion interrupt from the memory controller 4. In addition, in the command-pull model of FIG. 1, synchronization, or handshaking, takes place between the controller CPU 6 and the host system 3 in order to pull commands from the queue 13 of the system memory device 12 into the memory controller 4. Eliminating these latencies will typically result in a reduction in write latency of one to two orders of magnitude compared to the command-pull model shown in FIG. 1.

Because the memory controller 70 takes ownership of commands once they have been pushed into the queue 91 of the NVM 90, it is important for the NVM 90 to be protected against power failures. Such protection can be achieved in a number of ways, but one way is to use a battery backup (BBU), super-capacitor (Supercap) dynamic random access memory (DRAM) device for the NVM 90. The manner in which a BBU, Supercap DRAM device or other suitable memory device may be selected for this purpose will be understood by those of skill in the art.

In order for the memory driver 50 to efficiently push commands into the queue 91, the NVM device 90 should be directly accessible by the memory driver 50 via the bus 65. This accessibility may be accomplished in a number of ways. One way to accomplish this is to use the same command and data structure in the NVM device 90 that is used in the host system 30. This is possible in PCIe through a convenient programming of Base Address Registers (BARs), as will be understood by persons of skill in the art. The data transfer from the host system 3 to the NVM device 90 can be accomplished programmatically by the memory driver 50.

The memory driver 50 should also be provided with a way of determining which entries in the NVM device 90 are available in order to map/tag them with command information. Each command is made up of a data set and command information. The command information includes information such as Read/Write, Block address, pointers, and flags. The command information varies in accordance with the command type and is created independently of the data set. Both the data set and the command information need to be moved into the NVM 90 and the data set has to be mapped/tagged with the corresponding command information to ensure consistency between the command information and the data set. The manner in which this is accomplished will vary depending on the type or configuration of the memory controller 70 that is used. All memory controllers are configurable to provide this functionality, although the efficiency of the solution will depend on the hardware, software and/or firmware implementation of the memory controller. Therefore, this issue will need to be addressed on a case-by-case basis, as will be understood by those of skill in the art.

Figure 3:
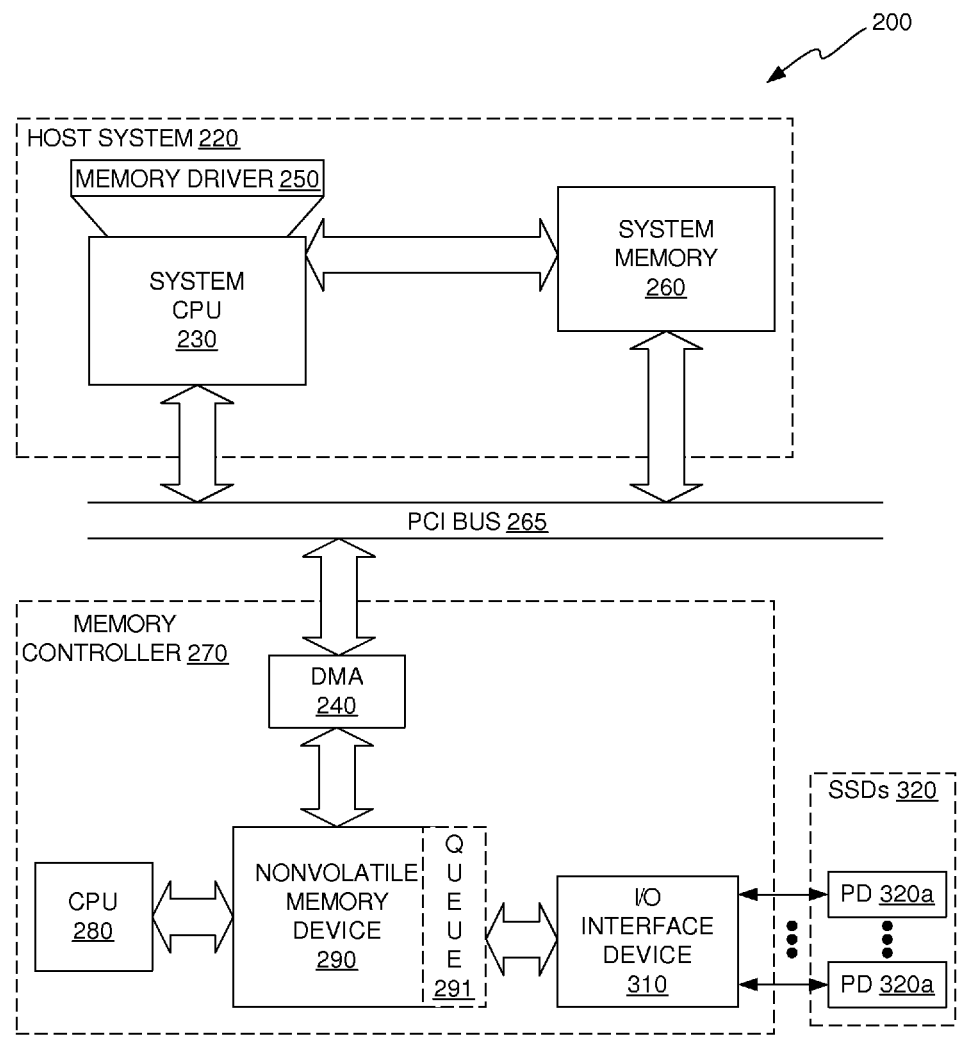
FIG. 3 illustrates a block diagram of a data storage system in accordance with another illustrative embodiment that implements a command-push model.

FIG. 3 illustrates a block diagram of a data storage system 200 in accordance with the second illustrative embodiment, in which a DMA engine is used to push commands and data into the queue of the memory device of the memory controller. Although the DMA engine may be part of the host system or part of the memory controller, for illustrative purposes it is shown and described as being part of the memory controller. The system 200 includes a host system 220, a memory controller 270, a PCI or PCIe bus 265, and at least one SSD 320 comprising PDs 320a. The host system 220 includes a system CPU 230 and a system memory device 260. The memory controller 270 includes a DMA engine 240, a CPU 280, an NVM device 290, and an I/O interface device 310. The NVM device 290 is typically a DRAM device, and it has the same protections described above with reference to NVM 90. A portion of the NVM device 290 is used as a command queue 291. The I/O interface device 310 is configured to perform data transfer in compliance with known data transfer protocol standards, such as the SAS, SATA and/or NVMe standards. The I/O interface device 310 controls the transfer of data to and from multiple PDs 320a of the SSD(s) 320. The memory controller 270 communicates with the system CPU 230 via the PCI bus 265 and the memory driver 250. The system memory device 260 stores software programs for execution by the system CPU 230 and data.

In accordance with this illustrative embodiment, the DMA engine 240 communicates with the memory driver 250 via the bus 265 and communicates directly with the NVM device 290. During a typical write action, the memory driver 250 pushes the command and any associated data to the DMA engine 240 via bus 265. The DMA engine 240 stores the command and data in the command queue 291 of the NVM device 290. No synchronization or handshaking between the host system 220 and the memory controller 270 is needed to perform the push action. Once the DMA engine 240 has stored a write command and the associated data into the command queue 291, it preferably notifies the controller CPU 280 that the command and data are in the NVM 290, typically by issuing an interrupt. The OS of the host system 220 considers the write command completed as of the time that the command and data are transferred to the DMA engine 240. Therefore, it is not necessary for the memory controller 270 to issue a completion interrupt to the host system 220 to inform it that the write command has been completed.

When the controller CPU 280 is ready to execute the command, it retrieves the command and data from the NVM device 290 and executes the command. In the case of a write command, the controller CPU 280 causes the associated data to be written to the SSD PDs 320a via the I/O interface device 310. In the case of a read command, the controller CPU 280 checks cache (not shown for clarity) of the NVM 290 to determine whether the data to be read is in cache, and if it is, reads the data from cache and transfers it to the host system 220. If the data to be read is not in cache, the CPU 280 causes the data to be read from the SSD PDs 320a and transferred to the host system 220.

As with the command-push model described above with reference to FIG. 2, with the command-push model of FIG. 3, command ownership is transferred from the host system 220 to the queue 291 of the NVM device 290 before the controller CPU 280 is even aware of the command. As with the command-push model described above with reference to FIG. 2, with the command-push model of FIG. 3, no synchronization, or handshaking, is required between the controller CPU 280 and the host system 22 in order to push commands into the queue 291. Therefore, the latencies described above with reference to FIG. 1 are eliminated.

Figure 4:
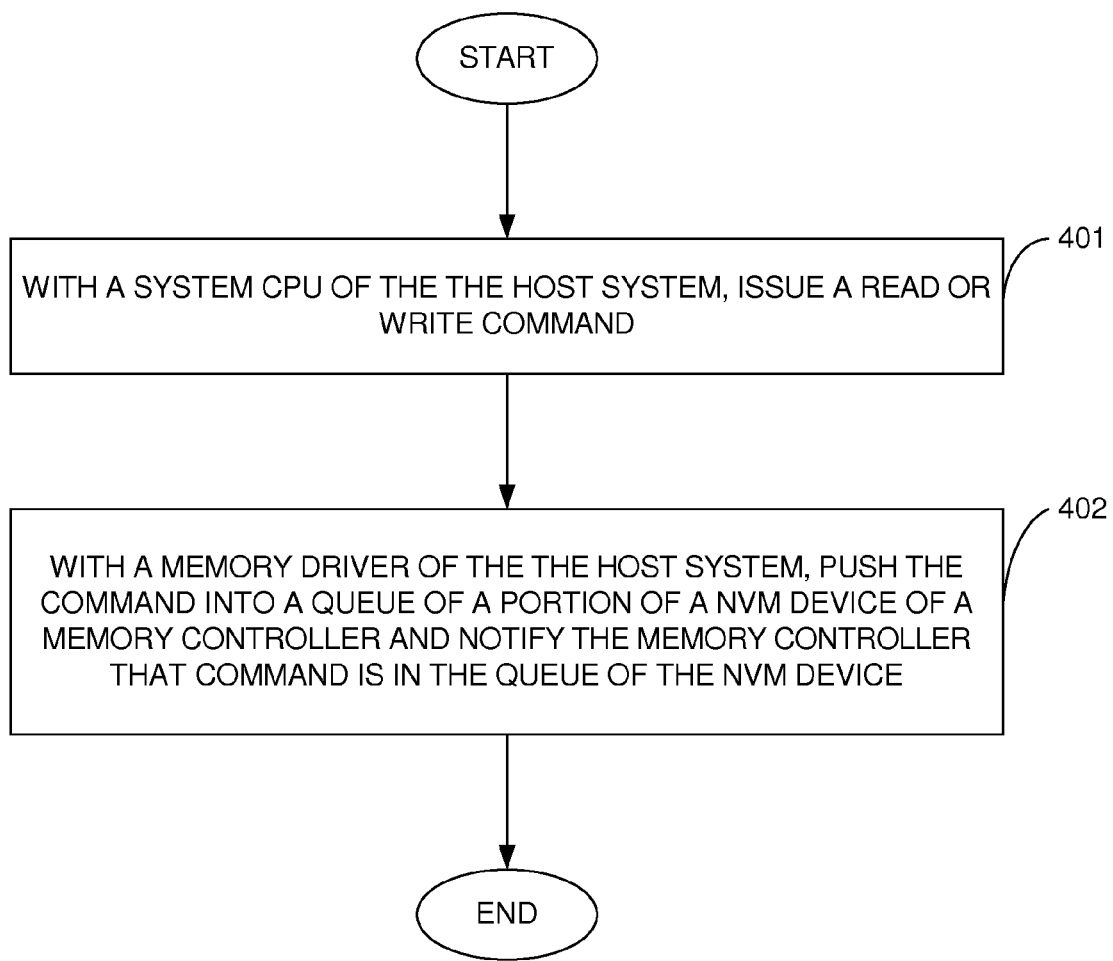
FIG. 4 illustrates a flowchart that represents the command-push method performed by the data storage system shown in FIG. 2.

FIG. 4 illustrates a flowchart that represents the command-push method in accordance with an illustrative embodiment performed in part by the host system 30 and in part by the memory controller 70 shown in FIG. 2. The method will be described with reference to a single command, although the steps of the method could also be performed simultaneously on multiple commands. The system CPU 40 issues a read or write command, as indicated by block 401. The memory driver 50 of the host system 30 pushes the command into the queue 91 of the NVM device 90 and notifies the memory controller 70 that the command is in the NVM device 90, as indicated by block 402.

In the case of a write command, the data associated with the command is also pushed into the NVM device 90. Subsequently, the command and data read from the NVM device 90 are written to the PDs 120a of the SSD(s) 120. In the case of a read command that has been pushed into the NVM device 90, the memory controller 70 will typically determine whether the data is stored in the cache of the NVM device 90. If the memory controller 70 determines that the data is stored in cache (i.e., a cache hit), it reads the data from cache and transfers it to the host system 30. If the memory controller 70 determines that the data is not stored in cache (i.e., a cache miss), it reads the data from the PDs 120a of the SSD(s) 120 and transfers the data to the host system 30.

In the case in which a write command is pushed into the queue 91 of the NVM device 90, the IO is complete in the host system 30 once the memory driver 50 pushes the write command into the queue 91. In the case in which a read command is pushed into the queue 91, the IO is not complete in the host system 30 until the read data is returned to the host system 30, which is the way read commands are handled in the known storage system 2 shown in FIG. 1. The reduction in latency achieved by the methods and systems of the invention is most significant with respect to write commands due to the fact that synchronization is no longer required to transfer write commands from the host system 30 into the memory controller 70 and due to the fact that the host system 30 no longer has to wait for a completion interrupt before it considers the write command completed.

Figure 5:
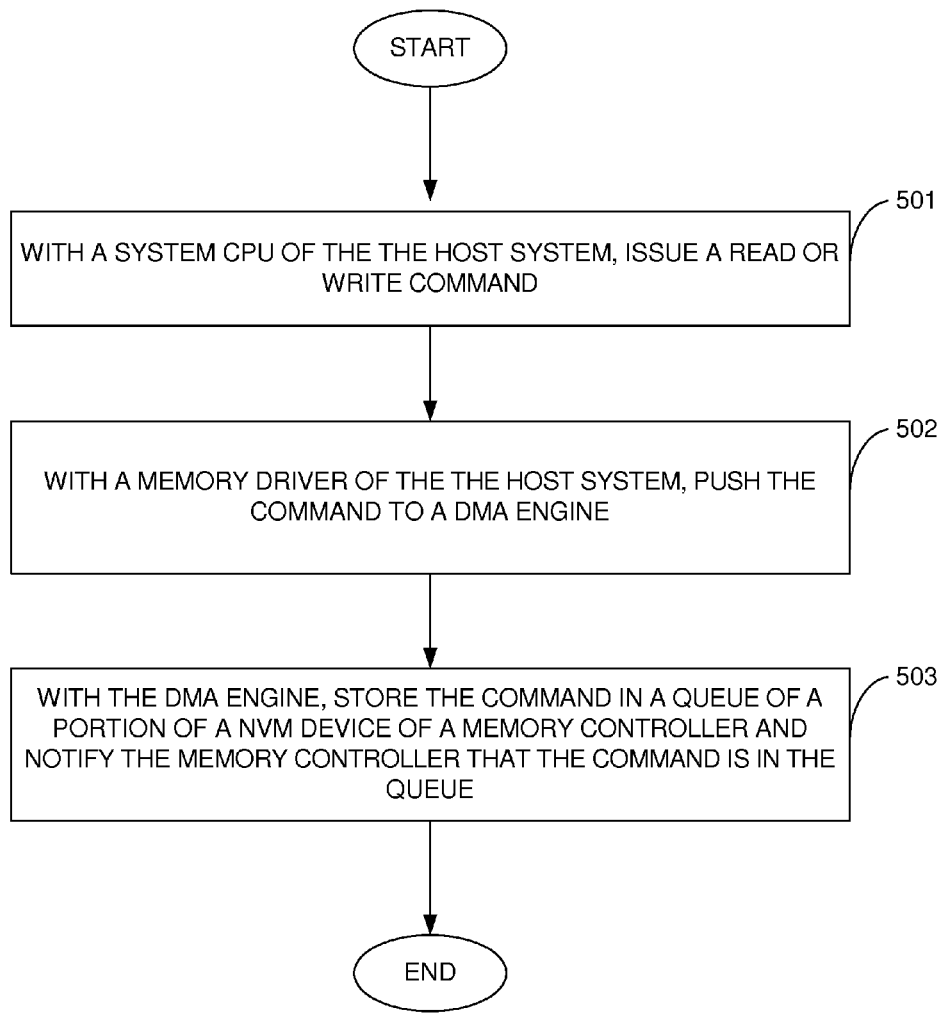
FIG. 5 illustrates a flowchart that represents the command-push method performed by the data storage system shown in FIG. 3.

FIG. 5 illustrates a flowchart that represents the command-push method in accordance with an illustrative embodiment performed in part by the host system 220 and in part by the memory controller 270 shown in FIG. 3. The method will be described with reference to a single command, although the steps of the method could also be performed simultaneously on multiple commands. The system CPU 230 issues a read or write command, as indicated by block 501. The memory controller 250 pushes the command to the DMA engine 240, as indicated by block 502. The DMA engine 240 stores the command in the queue 291 of the NVM device 290 and notifies the memory controller 270 that the command is in the NVM device 290, as indicated by block 503. The invention is not limited with respect to the way in which the memory controller 270 is notified that a command has been placed in the queue 291. This could be accomplished in a number of ways, e.g., issuing an interrupt, updating a value in a register, etc., as will be understood by those of skill in the art.

The functionality of the host systems 30 and 220 and of the memory controllers 70 and 270 may be implemented in hardware, software, firmware, or a combination thereof. The computer code for implementing functionality in software or firmware is stored on a computer-readable medium (CRM), such as system memory devices 60 and 260 or NVM devices 90 or 290 or some other memory device. The CRM may be any type of memory device including, but not limited to, magnetic storage devices, solid state storage devices, flash memory devices, and optical storage devices. Each of the CPUs 40, 80, 230 and 280 typically comprises at least one microprocessor, but may comprise any type of processor that is capable of providing the functionality that is necessary or desired to perform the associated tasks, including, for example, a microcontroller, a digital signal processor (DSP), an application specific integrated circuit (ASIC), and a system on a chip (SOC). The term "processor," as that term is used herein, is intended denote these and other types of computational devices that may be programmed or configured to perform the tasks described above and any additional tasks that are deemed necessary to allow the CPUs 40, 80, 230 and 280 to perform their roles.

It should be noted that the invention has been described with reference to a few illustrative, or exemplary, embodiments for the purposes of demonstrating the principles and concepts of the invention. As will be understood by persons of skill in the art, many variations may be made to the illustrative embodiments described above without deviating from the scope of the invention. All such variations are within the scope of the invention. For example, although the PDs 120*a* and 320*a* are shown in FIGS. 2 and 3, respectively, as being implemented solely in at least one SSD 120 or 320, respectively, the PDs 120*a* and 320*a* may be implemented as a combination of one or more SSDs and one or more HDDs.

What is claimed is:

1. A data storage system comprising:
   a host system comprising a system processor and a system memory device;
   a memory controller comprising a controller processor, a nonvolatile memory (NVM) device and an input/output (I/O) interface device, wherein a portion of the NVM device is used as a command queue;
   at least one solid state drive (SSD) connected to the I/O interface device, wherein said at least one SSD is configured as an array of physical disk drives (PDs); and
   a bus interconnecting the host system with the memory controller, wherein the host system accesses the NVM device via the bus and pushes commands into the command queue of the NVM device via the bus.

2. The data storage system of claim 1, wherein the system processor executes a memory driver program that accesses the NVM device via the bus and pushes the commands into the command queue of the NVM device via the bus.

3. The data storage system of claim 1, wherein the memory controller further comprises a direct memory access (DMA) engine that directly accesses the NVM device, and wherein the system processor executes a memory driver program that pushes the commands to the DMA engine via the bus, and wherein the DMA engine stores the commands in the command queue of the NVM device.

4. The data storage system of claim 1, wherein the host system notifies the memory controller when a command has been pushed into the command queue of the NVM device.

5. The data storage system of claim 2, wherein the host system and the NVM device use a same command and data structure.

6. The data storage system of claim 5, wherein the bus is a peripheral interconnect express (PCIe) bus, and wherein the memory driver program accesses the NVM device by using base address registers (BARs) of the PCIe bus.

7. A memory controller comprising:
   an input/output (I/O) interface device, wherein a portion of the NVM device is used as a command queue;
   at least one solid state drive (SSD) connected to the I/O interface device, wherein said at least one SSD is configured as an array of physical disk drives (PDs);
   a controller processor; and
   a nonvolatile memory (NVM) device, a portion of the NVM device being allocated as a command queue, wherein the NVM device is configured to be accessed by a host system via a bus that interconnects the host system with the memory controller, wherein the NVM device is configured to allow the host system to push commands into the command queue of the NVM device via the bus.

8. The memory controller of claim 7, wherein the NVM device is accessed by the host system via a memory driver program being executed by a processor of the host system, and wherein the bus is a peripheral interconnect express (PCIe) bus, and wherein the NVM device is accessible by the memory driver program through base address registers (BARs) of the PCIe bus.

9. The memory controller of claim 7, wherein the memory controller further comprises:
   a direct memory access (DMA) engine that communicates with the host system via the bus and that communicates directly with the NVM device, and wherein the DMA engine is accessed by the host system via the bus, and the DMA engine receives commands pushed to the DMA engine by the memory driver program and stores the commands in the command queue of the NVM device.

10. The memory controller of claim 8, wherein the NVM device uses a same command and data structure as the host system.

11. A method for reducing latency in a data storage system, the method comprising:
   in a memory controller comprising a controller processor, a nonvolatile memory (NVM) device and an input/output (I/O) interface device connected to at least one solid state drive (SSD) configured as an array of physical disk drives (PDs), configuring a portion of the NVM device as a command queue;
   with a host system interconnected with the memory controller via a bus, pushing a command into the memory controller via the bus; and
   in the memory controller, storing the command in the command queue of the NVM device.

12. The method of claim 11, wherein a system processor of the host system executes a memory driver program that accesses the NVM device via the bus and pushes the commands into the command queue of the NVM device via the bus.

13. The method of claim 11, wherein the memory controller further comprises a direct memory access (DMA) engine, and wherein a system processor of the host system executes a memory driver program that pushes commands from the host system to the DMA engine via the bus, and wherein the DMA engine stores the commands into the command queue of the NVM device via the bus.

14. The method of claim 12, further comprising:
   wherein the host system notifies the memory controller when a command has been pushed into the command queue of the NVM device.

15. The method of claim 12, wherein the host system and the NVM device use a same command and data structure.

16. The method of claim 15, wherein the bus is a peripheral interconnect express (PCIe) bus, and wherein the memory driver program accesses the NVM device by using base address registers (BARs) of the PCIe bus.

17. A non-transitory computer-readable medium having a computer program stored thereon for execution by a processor of a host system for pushing commands into a command queue of a non-volatile memory (NVM) device of a memory controller that is connected to the host system via a bus, the computer program comprising:
   a first code portion for receiving a command to read or write one or more addresses of a solid state drive (SSD) configured as an array of physical disk drives (PDs); and a second code portion for pushing the command into the memory controller.

18. The non-transitory computer-readable medium of claim 17, wherein the second code portion pushes the command into the command queue of the NVM device, and wherein the computer program further comprises:
a third code portion for notifying a processor of the memory controller when the command has been pushed into the command queue of the NVM device of the memory controller.

19. The non-transitory computer-readable medium of claim 17, wherein the second code portion pushes the command into a direct memory access (DMA) engine of the memory controller, wherein the DMA engine is directly connected to the NVM device to allow the DMA engine to store the command in the command queue, and wherein the computer program further comprises:
a third code portion for notifying a processor of the memory controller when the command has been pushed into the command queue of the NVM device of the memory controller.

\* \* \* \* \*